United States Patent
Fuwa et al.

(10) Patent No.: US 6,244,244 B1
(45) Date of Patent: Jun. 12, 2001

(54) CONTROLLER OF INTERNAL COMBUSTION ENGINE

(75) Inventors: Naohide Fuwa, Susono; Noboru Takagi; Hiroyuki Mizuno, both of Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/481,472

(22) Filed: Jan. 11, 2000

(30) Foreign Application Priority Data

Jan. 12, 1999 (JP) .................................................. 11-005361

(51) Int. Cl.[7] ............................ F02B 17/00; F02D 43/00; F02P 5/15
(52) U.S. Cl. ...................... 123/295; 123/305; 123/406.45
(58) Field of Search .................................... 123/295, 305, 123/406.45

(56) References Cited

U.S. PATENT DOCUMENTS 5,947,079 * 9/1999 Sivashankar et al. ............... 123/295
6,050,238 * 4/2000 Suzuki et al. ........................ 123/295

FOREIGN PATENT DOCUMENTS 5288098    11/1993 (JP) .

* cited by examiner

Primary Examiner—Tony M. Argenbright
(74) Attorney, Agent, or Firm—Kenyon & Kenyon

(57) ABSTRACT

A controller for an internal combustion engine that switches combustion modes in accordance with the running conditions of the engine. When there is a need to reduce the engine torque, the controller decreases the torque by a predetermined torque reduction method. The controller decreases the engine torque by a first torque reduction method when the engine is in a first combustion mode. When the engine is in a second combustion mode, the controller reduces the torque by a second torque reduction method. The controller sets a first control amount, which corresponds to the torque reduction requirement, according to one of the first and second torque reduction methods. The controller converts the first control amount into a second control amount, which corresponds to the other torque reduction method.

17 Claims, 5 Drawing Sheets

CONTROLLER OF INTERNAL COMBUSTION ENGINE

BACKGROUND OF THE INVENTION

The present invention relates to an internal combustion engine that changes combustion modes. More particularly, the present invention pertains to a controller for reducing the torque of such an engine.

To improve fuel economy and to increase engine power at the same time, engines that change combustion mode according to current running conditions have been introduced. Japanese Unexamined Patent Publication No. 5-288098 discloses such an engine.

In that publication, the engine includes a fuel injector to supply fuel to each combustion chamber. When receiving a relatively great load, the engine must increase its power to increase the speed to a relatively high speed range. In this state, the engine performs homogeneous combustion, that is, it distributes and burns homogeneously mixed air-fuel mixture. Specifically, homogeneous combustion is performed by homogeneously mixing fuel injected during an intake stroke of a piston and igniting the mixture in the combustion chamber.

When the load applied to the engine is relatively small and the engine speed is low, the engine does not need to increase its power. In this state, the engine performs stratified combustion to enrich the air-fuel mixture near the spark plug. As a result, the mixture is easier to ignite. At the same time, the overall air-fuel ratio is adjusted to be slightly greater than the theoretical, or stoichiometric, air-fuel ratio, which improves the fuel economy. During stratified combustion, fuel is injected toward a recess formed on the head of a piston in the combustion chamber during a compression stroke, which concentrates fuel in the vicinity of the plug. The mixture of the concentrated fuel and the air in the combustion chamber is ignited by the spark plug.

Switching the combustion modes of an engine between homogenous charge combustion and stratified combustion improves the fuel economy and provides sufficient engine power when required.

The output torque of a vehicle internal combustion engine sometimes needs to be reduced in accordance with the current running conditions. For example, the output torque must be reduced when an automatic transmission coupled to the engine shaft is shifted. Shifting an automatic transmission produces shift shock. The shift shock is reduced by decreasing the engine output torque when the transmission is shifted.

Several methods of decreasing the output torque of engines are known. These include decreasing the amount of intake air, delaying the ignition timing and decreasing the amount of injected fuel. These methods may be applied to the above described engine, which switches the combustion modes. However, a given method of reducing the torque is not necessarily suitable for each combustion mode.

Delaying the phase of the ignition timing during stratified combustion destabilizes fuel combustion, which may lead to misfires. During stratified combustion, ignition must be executed when relatively a rich air-fuel mixture is in the vicinity of the spark plug. However, if the ignition timing is delayed, ignition is executed when the richer mixture is not near the spark plug.

During homogeneous combustion, decreasing the amount of injected fuel by a significant amount will lead to misfires if the amount of intake air is constant. Thus, the output torque cannot be significantly reduced by decreasing the injected fuel amount. That is, the output torque can be reduced only by a small amount by decreasing the injected fuel amount. As a result, the output torque cannot be reduced to the required level.

The above drawbacks are present not only when shifting an automatic transmission but also when a traction control apparatus commands the engine to decrease the output torque to keep a wheel from spinning and also when the engine output torque is reduced to reduce the shock caused by abrupt depression of the accelerator.

SUMMARY OF THE INVENTION

Accordingly, it is an objective of the present invention to provide a controller that properly decreases the output torque of an engine that switches combustion modes.

To achieve the foregoing and other objectives and in accordance with the purpose of the present invention, a controller of an engine having a plurality of combustion modes is provided. One of the combustion modes is selected depending on the running conditions of the engine. The controller reduces the output torque of the engine according to one of a plurality of predetermined torque reduction methods when a torque reduction requirement is in effect. The controller includes control means, setting means and converting means. The control means controls the engine to decrease the output torque according to a first torque reduction method when the engine is in a first combustion mode. The control means also controls the engine to decrease the output torque according to a second torque reduction method when the engine is in a second combustion mode, which is different from the first combustion mode. The setting means sets a first control amount that corresponds to the torque reduction requirement according to the first torque reduction method. The converting means converts the first control amount to a second control amount according to the second torque reduction method. The control means controls the engine according to the first control amount when the control means reduces the output torque by the first torque reduction method. The control means controls the engine according to the second control amount when the control means reduces the output torque by the second torque reduction method.

One of the first and second torque reduction methods is selected in accordance with the combustion mode of the engine and the output torque of the engine is reduced by the selected method. That is, the torque of the engine is reduced by a method that is suitable for the current combustion mode. Therefore, in an engine that switches the combustion mode, the engine torque can be properly reduced. Once the control amount of one of the first and second torque reduction methods is set, the other control amount is calculated by converting the first control amount. Such conversion shortens the time required for computing required torque reduction control amount, which is determined in accordance with the purpose of the torque reduction. The method also reduces the storage capacity required for storing maps, which are used for computing the required torque reduction amount.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 5. In the first embodiment, the present invention is embodied in an in-line four cylinder type gasoline engine 11 for vehicles.

Figure 1:
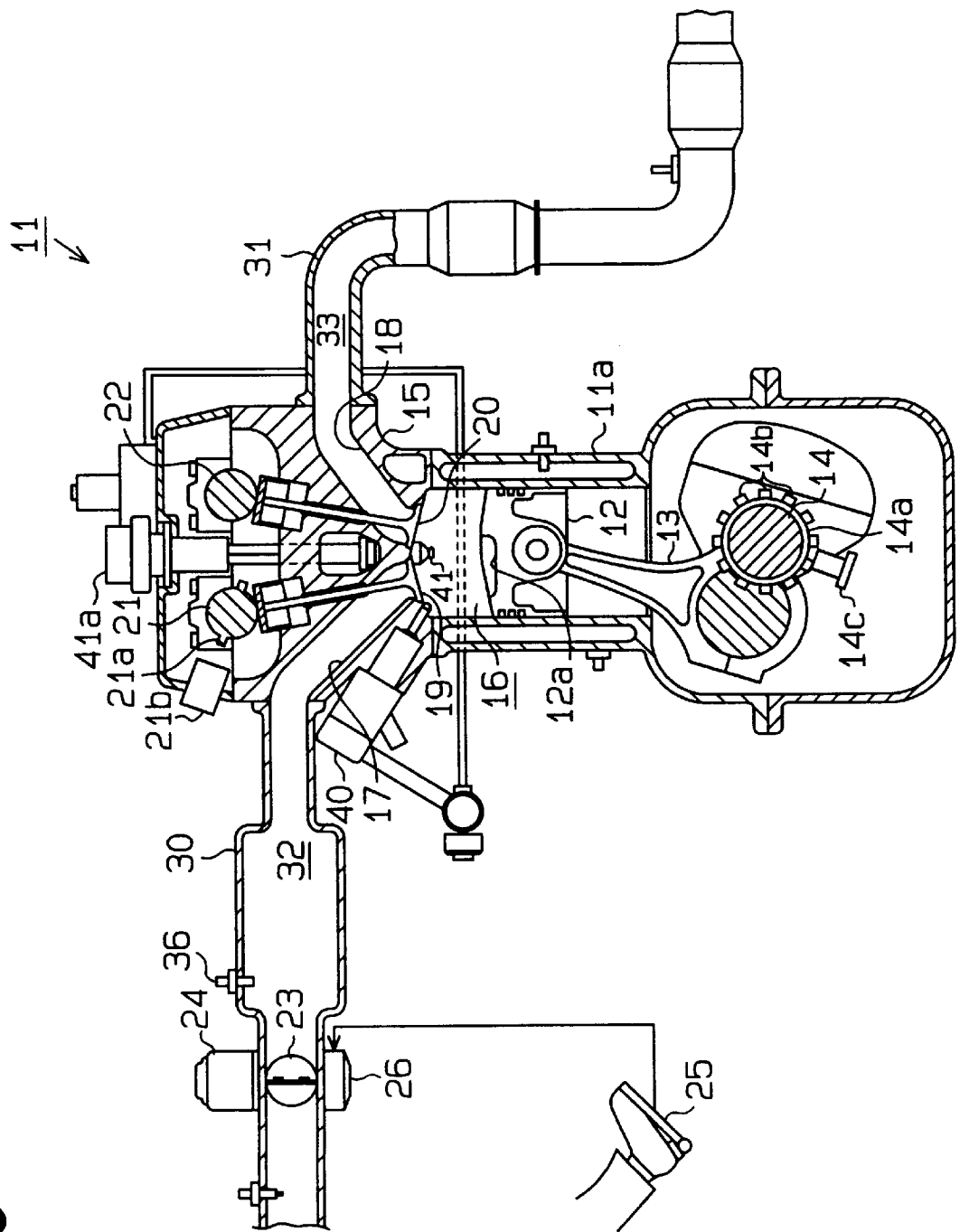
FIG. 1 is a schematic, cross-sectional view illustrating an engine controlled by a controller according to a first embodiment of the present invention.

As shown in FIG. 1, the engine 11 includes four pistons 12 (only one is shown in FIG. 1). The pistons 12 are reciprocally accommodated in a cylinder block 11a. Each piston 12 is connected to a crankshaft 14 by a connecting rod 13. The connecting rods 13 convert reciprocation of the pistons 12 into rotation of the crankshaft 14. A recess 12a is formed in the head of each piston 12. The recesses 12a are used when stratified combustion is performed.

A signal rotor 14a is coupled to the crankshaft 14. The signal rotor 14a has teeth 14b. The teeth 14b are arranged along a circle centered on the axis of the crankshaft 14 and are spaced from one another by equal angular intervals. A crank position sensor 14c is located in the vicinity of the signal rotor 14a. When the crankshaft 14 is rotated, the teeth 14b of the signal rotor 14a pass by the crank position sensor 14c. The sensor 14c outputs pulse signals, each of which corresponds to one of the teeth 14b.

A cylinder head 15 is arranged on top of the cylinder block 11a. A combustion chamber 16 is defined between each piston 12 and the cylinder head 15. The cylinder head 15 has intake ports 17 and exhaust ports 18. Each intake port 17 and each exhaust port 18 communicate with one of the suction chambers 16.

As shown in FIG. 1, the cylinder head 15 supports an intake camshaft 21, an exhaust camshaft 22, intake valves 19 and exhaust valves 20. The camshafts 21, 22 are coupled to the crankshaft 14 by a timing belt and gears (neither is shown). The belt and the gears transmit rotation of the crankshaft 14 to the camshafts 21, 22. Rotation of the intake camshaft 21 reciprocates the intake valves 19, which connect and disconnect each combustion chamber 16 with the corresponding suction port 17. Rotation of the exhaust camshaft 22 reciprocates the exhaust valves 20, which connect and disconnect each combustion chamber 16 with the corresponding exhaust port 18.

A cam position sensor 21b is located in the vicinity of the intake camshaft 21. The cam position sensor 21b detects projections 21a formed on the camshaft 21 and outputs detection signals accordingly. When the intake camshaft 21 rotates, the projections 21a pass by the cam position sensor 21b. The cam position sensor 21b outputs a detection signal as each projection 21a passes by the sensor 21b.

The intake ports 17 are connected to an intake manifold 30. The exhaust ports 18 are connected to an exhaust manifold 31. The intake manifold 30 and the intake ports 17 form an intake passage 32. The exhaust manifold 31 and the exhaust ports 18 form an exhaust passage 33. A throttle valve 23 is located in the upstream portion of the intake passage 32. The throttle valve 23 is coupled to a motor 24, which adjusts the opening of the throttle valve 23.

An acceleration pedal 25 is located in the passenger compartment. The throttle motor 24 is controlled based on the depression amount of the acceleration pedal 25. Specifically, when the driver steps on the acceleration pedal 25, the depression amount of the acceleration pedal 25 is detected by a pedal position sensor 26. The motor 24 is actuated in accordance with detection signal of the sensor 26. Accordingly, the cross-sectional area of the intake passage 32 is varied, which controls the amount of air introduced into each combustion chamber 16.

A vacuum sensor 36 is located at the downstream side of the throttle valve 23 in the intake passage 32. The vacuum sensor 36 detects the pressure in the passage 32 and outputs a detection signal corresponding to the detected pressure.

As shown in FIG. 1, the cylinder head 15 includes fuel injectors 40 and spark plugs 41. Each fuel injector 40 corresponds to and supplies fuel to one of the combustion chambers 16. Each spark plug 41 ignites an air-fuel mixture in the corresponding combustion chamber 16. The ignition timing of each spark plug 41 is adjusted by an igniter 41a, which is located above the spark plug 41. Fuel injected from each injector 40 into the corresponding combustion chamber 16 is mixed with air drawn into the combustion chamber 16 through the intake passage 32, which forms an air-fuel mixture in the combustion chamber 16. The mixture is then ignited by the corresponding spark plug 41. Thereafter, the resulting products of combustion discharged to the exhaust passage 33.

Figure 2:
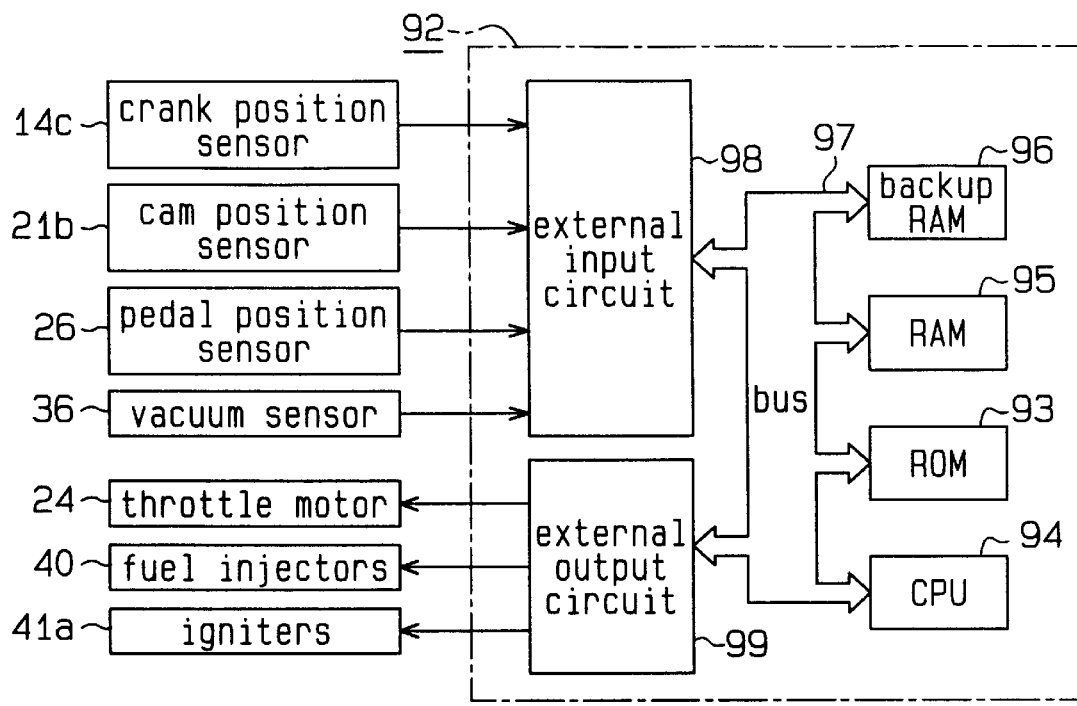
FIG. 2 is a block diagram, showing an electrical construction of the controller of FIG. 1.

A controller of the engine 11 according to the first embodiment will now be described with reference to FIG. 2.

The controller includes an electronic control unit (ECU) 92. The ECU 92 controls the running conditions of the engine 11. Specifically, the ECU 92 controls the fuel injection amount, the injection timing, the ignition timing and throttle opening and switches the combustion modes of the engine 11. The ECU 92 is a logic circuit including a ROM 93, a CPU 94, a RAM 95 and a backup RAM 96.

The ROM 93 stores various control programs and maps used in the programs. The CPU 94 executes various computations based on the programs and the maps stored in the ROM 93. The RAM 95 temporarily stores the result of the computations and data from various sensors. The backup RAM 96 is a non-volatile memory that stores necessary data when the engine 11 is stopped. The ROM 93, the CPU 94, the RAM 95 and the backup RAM 96 are connected to one another by a bus 97. The bus 97 also connects the ROM 93, the CPU 94, the RAM 95 and the backup RAM 96 to an external input circuit 98 and an external output circuit 99.

The external input circuit 98 is connected to the crank position sensor 14c, the cam position sensor 21b, the pedal position sensor 26 and the vacuum sensor 36. The external output circuit 99 is connected to the throttle motor 24, the fuel injectors 40 and the igniters 41a.

The ECU 92 switches between stratified combustion mode and homogeneous combustion mode in accordance with the running conditions of the engine 11. When the engine 11 is running at a relatively high speed with a relatively great load, the ECU 92 controls the engine 11 to perform homogeneous combustion. When the engine 11 is running at a relatively low speed with a relatively small load, the ECU 92 controls the engine 11 to perform stratified combustion. Specifically, when the engine 11 is running at a relatively high speed with a relatively great load, the power of the engine 11 needs to be increased. In this state, the ECU 92 controls the engine 11 to perform homogeneous combustion to enrich the air-fuel mixture thereby increasing the power. When the engine 11 is running at a relatively low speed with a relatively small load, the power of the engine 11 does not need be increased. In this state, the ECU 92 controls the engine 11 to perform stratified combustion to make the air-fuel mixture leaner thereby improving the fuel economy.

When controlling the engine 11 to perform homogeneous combustion, the ECU 92 computes a basic fuel injection amount Qbse. Specifically, the ECU 92 reads the intake pressure PM based on the detection signal of the vacuum sensor 36 and the engine speed NE based on the detection signal of the crank position sensor 14c. The ECU 92 then computes the basic fuel injection amount Qbse based on the intake pressure PM and the engine speed NE according to a conventional map. The ECU 92 computes a final injection amount Qfin based on the basic fuel injection amount Qbse. The ECU 92 then controls each injector 40 to inject the corresponding amount of fuel into the associated combustion chamber 16 during the intake stroke of the associated piston 12. The air-fuel ratio of the mixture in each combustion chamber 16 is equal to or higher than the stoichiometric air-fuel ratio. Further, the ECU 92 controls the throttle motor 24 and the igniters 41a to optimize the throttle opening and the ignition timing for homogeneous combustion.

When controlling the engine 11 to perform stratified combustion, the ECU 92 computes a basic fuel injection amount Qbse based on the acceleration pedal depression amount ACCP and the engine speed NE. The ECU 92 then computes the final fuel injection amount Qfin based on the basic fuel injection amount Qbse. The ECU 92 controls each injector 40 to inject the corresponding amount of fuel into the associated combustion chamber 16 during the compression stroke of the associated piston 12. The air-fuel ratio of the mixture in each combustion chamber 16 is greater (leaner) than that of homogeneous combustion. Further, the ECU 92 controls the throttle motor 24 and the igniter 41a to optimize the throttle opening and the ignition timing for stratified combustion.

During stratified combustion, fuel is injected from each injector 40 during the compression stroke of the associated piston 12. The fuel enters the recess 12a(see FIG. 1) of the piston 12 and is concentrated about the associated spark plug 41. The concentration of fuel allows the mixture about the plug 41 to be easily ignited despite the fact that the overall air fuel ratio is greater than that of homogeneous combustion. Also, to make the overall air-fuel ratio greater than that of homogeneous combustion, the throttle opening is increased to increase the amount of intake air, which decreases the pumping loss of the engine.

The output torque of the engine 11 is controlled in accordance with the running conditions of the vehicle. For example, the output torque must be reduced when the automatic transmission is shifted and when the acceleration pedal 25 is abruptly depressed. The output torque must also be reduced when a traction control apparatus commands the engine to decrease the output torque to keep wheels from spinning. When there is a need to decrease the engine output torque, the ECU 92 determines the value of a required torque reduction amount. The output torque of the engine 11 must be reduced by a greater degree as the value of the required torque reduction amount is increased.

When performing homogeneous combustion, the ECU 92 delays the ignition timing to decrease the engine output torque in accordance with the required torque reduction amount. Delaying the ignition timing decreases the engine output torque by a greater degree compared to decreasing the injection fuel amount during homogeneous combustion. Accordingly, the torque is quickly reduced to a desired level. The basic ignition timing SAbse is computed based on the intake pressure PM and the engine speed NE. Then, the final ignition timing SAfin is computed by adding a delay amount $\Delta SA$ to the basic ignition timing SAbse. The ignition timing is set to the final ignition timing SAfin. The value of the delay amount $\Delta SA$ increases as the required torque reduction amount increases.

During stratified combustion, the ECU 92 decreases the fuel injection amount to decrease the output torque of the engine 11 in accordance with the required torque reduction amount. This is because delaying the ignition timing during stratified combustion, in which a relatively rich air-fuel mixture is provided about each ignition plug 41 and ignited, degrades the combustion state. Thus, the engine torque is reduced by decreasing the injection amount. Specifically, a basic injection amount Qbse is multiplied by a reduction coefficient KQ to calculate a final injection amount Qfin. Then, the corresponding amount of fuel is injected from each injector 40. The value of the reduction coefficient KQ is smaller for a greater values of the required torque reduction amount.

In this manner, the engine torque is reduced by selectively executing two torque reduction methods, which are delaying the ignition timing and decreasing the injection amount, in accordance with the combustion mode. Therefore, the torque of the engine 11, which switches the combustion modes, is properly reduced by a torque reduction method selected in accordance with the current combustion mode.

However, since the engine torque is reduced by one of the two different methods, either delaying the ignition timing or decreasing the fuel injection amount, delay amount $\Delta SA$ and the reduction coefficient KQ must be computed for a given torque reduction. Further, optimal values of delay amount and the coefficient $\Delta SA$ and KQ vary depending on the purpose of the torque reduction. The purposes include reducing the shift shock of an automatic transmission, preventing wheels from spinning, reducing shock caused by acceleration and others. Thus, maps corresponding to each purpose are required for each values $\Delta SA$ and KQ. Each map must be previously made through experiments so that optimal values of the delay amount and the coefficient $\Delta SA$ and KQ are obtained for a given torque reduction requirement. This increases the time required for setting the required maps. In order to store a great number of maps, the ROM 93 must have a great storage capacity.

In this embodiment, the delay amount $\Delta SA$ is first computed in accordance with a required torque reduction. Then, the reduction coefficient KQ is computed by multiplying the delay amount $\Delta SA$ with a conversion value n. The conversion value n is computed based on the engine speed NE and the engine load, according to a map. The value n is determined such that the reduction coefficient KQ is decreased as the delay amount $\Delta SA$ increases.

The maps for computing the value n also must be obtained through experiments. However, the number of the maps for computing the value n do not need to correspond to the number of the purposes for the torque reduction. That is, one common map can used for two or more similar purposes. Thus, compared to the number of the maps for computing the reduction coefficient KQ, the number of the maps for computing the conversion value n is small.

As described above, the reduction coefficient KQ is computed by converting the delay amount ΔSA, which reduces the total number of maps for computing the delay amount ΔSA and the reduction coefficient KQ. Accordingly, the time need for the experiments to obtain the maps is shortened. Also, the storage capacity of the ROM 93 needs a relatively small storage capacity.

The routine for computing the final ignition timing SAfin will now be described with reference to FIG. 15. This routine is an interrupt executed by the ECU 92 at predetermined time intervals.

Figure 3:
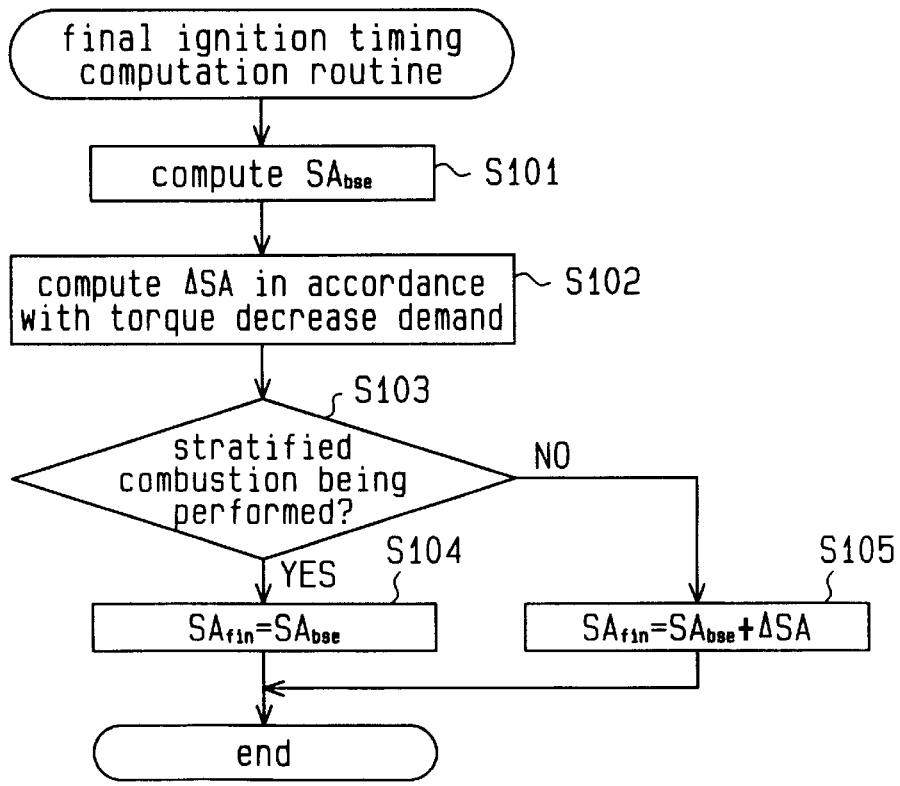
FIG. 3 is a flowchart showing a routine for computing final ignition timing according to the first embodiment.

When entering the routine of FIG. 3, the ECU 92 computes the basic ignition timing SAbse based on the engine speed NE and either the intake pressure PM or the basic injection amount Qbse, according to a conventional map. The basic ignition timing SAbse is advanced as the engine speed NE increases. The basic timing SAbse is delayed as the engine load increases, that is, as the intake pressure PM or the basic fuel injection amount Qbse increases.

At step S102, the ECU 92 computes the delay amount ΔSA based on the required torque reduction amount by referring to a map. The delay amount ΔSA is computed by referring to a map, which is selected in accordance with the purpose of the torque reduction requirement. The value of the delay amount ΔSA is greater for greater values of the required torque reduction amount and is set to zero when there is no need to reduce the torque.

At step S103, the ECU 92 judges whether stratified combustion is being performed. If stratified combustion is being performed, the ECU 92 moves to step S104. At step S104, the ECU 92 substitutes the basic ignition timing SAbse for the final ignition timing SAfin. Thereafter, the ECU 92 temporarily terminates the routine. If homogeneous combustion is being performed at step S103, the ECU 92 moves to step S105. At step S105, the ECU 92 adds the delay amount ΔSA to the basic ignition timing SAbse to calculate the final ignition timing SAfin. Thereafter, the ECU 92 temporarily terminates the routine.

After calculating the final ignition timing SAfin, the ECU 92 controls the ignitors 41a in another routine such that the actual ignition timing matches the final ignition timing SAfin.

Therefore, when stratified combustion is being performed, the basic ignition timing SAbse is set to the final ignition timing SAfin at step S104. In this case, the ignition timing is not delayed by the amount ΔSA for reducing the torque. When homogeneous combustion is being performed, the ignition timing is delayed by the amount ΔSA in accordance with the required torque reduction. The output torque of the engine 11 is properly reduced when homogeneous combustion is being performed.

Figure 4:
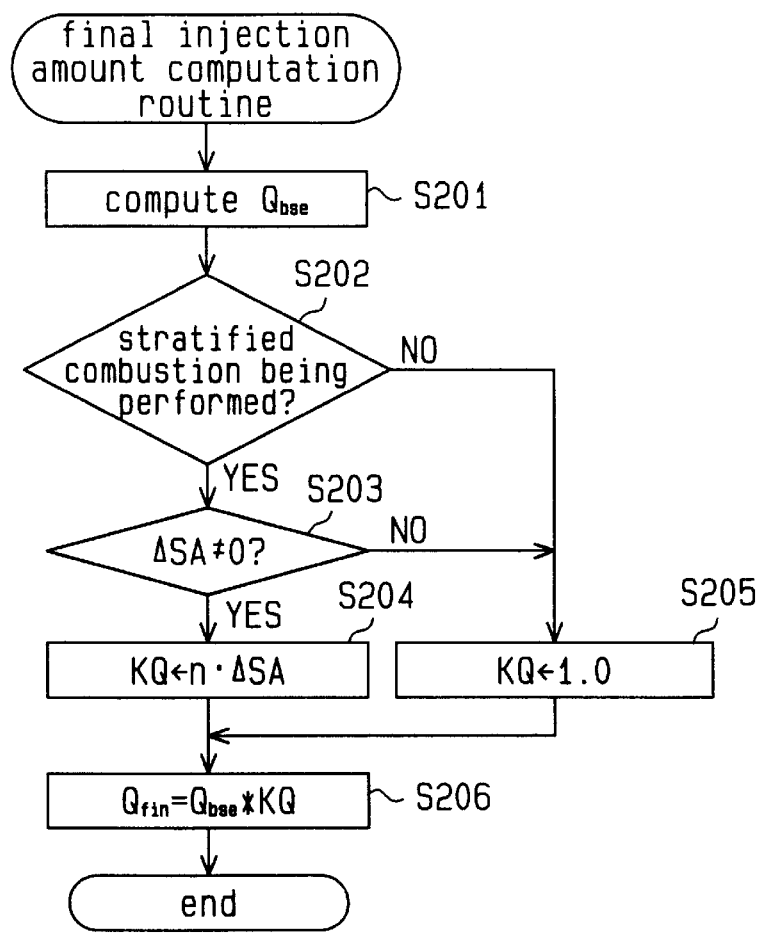
FIG. 4 is a flowchart showing a routine for computing final injection amount according to the first embodiment.

Computation of the final injection amount Qfin will now be described with reference to the routine of FIG. 4. This routine is an interrupt executed by the ECU 92 at predetermined time intervals.

When entering this routine, the ECU 92 computes the basic injection amount Qbse based on the engine speed NE and either the intake pressure PM or the acceleration pedal depression amount ACCP. The basic injection amount Qbse increases as either the intake pressure PM or the acceleration pedal depression amount ACCP increases. The basic injection amount Qbase also increases as the engine speed NE increases.

At step S202, the ECU 92 judges whether stratified combustion is currently being performed. If homogeneous combustion is being performed, the ECU 92 moves to step S205. At step S205, the ECU 92 sets the reduction coefficient KQ to 1.0 and moves to step S206. If stratified combustion is being performed at step S202, the ECU 92 moves to step S203. At step S203, the ECU 92 judges whether the delay amount ΔSA, which is computed at step S102 of the final ignition timing computation routine (FIG. 3), has a value other than zero. In other words, the ECU 92 judges whether a torque reduction is required.

If the delay amount ΔSA is zero, the ECU 92 judges that a torque reduction is not needed. In this case, the ECU 92 moves to step S205. At step S205, the ECU 92 sets the coefficient to 1.0 and moves to step S206. If the delay amount ΔSA is not zero at step S203, the ECU 92 judges that the torque reduction is needed and moves step S204. At step 204, the ECU 92 multiplies the delay amount ΔSA with the conversion value n to calculate the reduction coefficient KQ.

Figure 5:
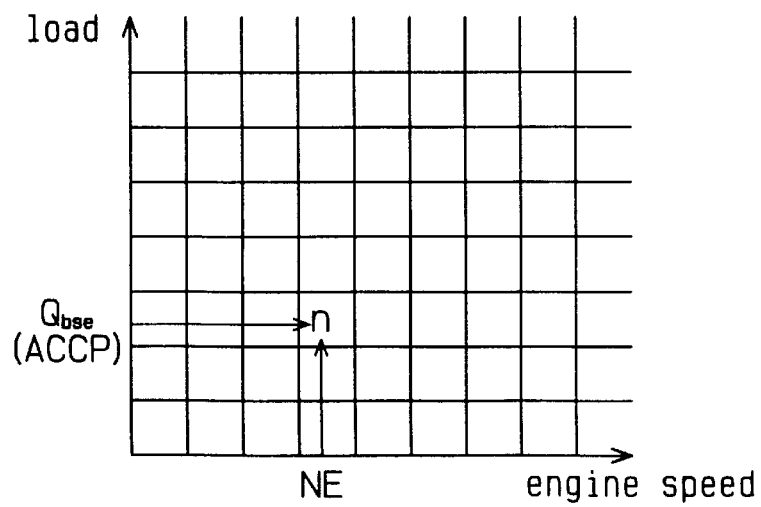
FIG. 5 is a graph showing a map used for determining a conversion value n, which is used for computing ignition timing.

The conversion value n is computed based on the basic injection amount Qbse, which is determined in accordance with the depression amount ACCP of the acceleration pedal 25, and the engine speed NE by referring, for example, to a map of FIG. 5. The number of maps for computing the conversion value n does not have to correspond to the number of the purposes for the torque reduction. However, one common map is used for two or more similar purposes. Therefore, the number of maps for computing the conversion value n is less than the number of the purposes for torque reduction. When computing the conversion value n, the ECU 92 selects a map that corresponds to the purpose of the torque reduction. The ECU 92 then computes the conversion value n based on the selected map.

The reduction coefficient KQ is computed based on the conversion value n. The value of the reduction coefficient KQ decreases as the required torque reduction amount increases, or as the delay amount ΔSA increases. When the engine 11 is running at a low speed with a small load, the conversion value n is determined such that the converted reduction coefficient KQ is greater than when the engine 11 is not running at a low speed with a small load. This is because decreasing the injection amount when the engine 11 is running at a low speed with a small load may reduce the torque of the engine 11 by an excessive amount.

After executing either step S204 or step S205, the ECU 92 moves to step 206. At step S206, the ECU 92 multiplies the basic injection amount Qbse with the reduction coefficient KQ for calculating the final injection amount Qfin. Thereafter, the ECU 92 temporarily terminates the routine. The ECU 92 then controls the injectors 40 to supply fuel the amount that corresponds to the final injection amount Qfin.

As described above, when homogeneous combustion is being performed or when torque reduction is not needed, the reduction coefficient KQ is set to 1.0 at step S205. Thus, the basic injection amount Qbse is used as the final injection amount Qfin. The injection amount is not reduced for reducing the torque. When stratified combustion is being performed, the injection amount is decreased based on the reduction coefficient KQ in accordance with the purpose of the required torque reduction. Accordingly, the output torque of the engine 11 is properly reduced during stratified combustion.

The embodiment of FIGS. 1 to 5 has the following advantages.

(1) When the torque of the engine 11 needs to be reduced, the method for reducing the torque is switched between delaying the ignition timing and decreasing the fuel injection amount in accordance with the current combustion mode of the engine. Therefore, in the engine 11, which switches the combustion modes, the engine torque is properly reduced by a process suitable for the current combustion mode.

(2) When the delay amount $\Delta$SA, which is used for delaying the ignition timing, is computed, the delay amount $\Delta$SA is converted into the reduction coefficient KQ, which is used for decreasing the injection amount, based on the conversion value n. The number of maps for computing the conversion value n does not have to correspond to the number of the purposes for the torque reduction. However, one common map is used for two or more similar purposes. Therefore, the number of maps for computing the conversion value n is less than the number of purposes. The required number of maps is less than that where maps for computing the delay amount $\Delta$SA and maps for computing the reduction coefficient KQ are prepared for each torque reduction purpose. Since the number of the required maps is small, the time required for experiments for making the maps is shortened. Also, the storage capacity of the ROM 93 can be reduced.

(3) The delay amount $\Delta$SA is converted into the reduction coefficient KQ by the conversion value n. The value n is determined according to the engine speed NE and the engine load, which permits the conversion to be accurately executed. When the engine 11 is running at a relatively low speed with a relatively small load, the conversion value n is determined such that the converted reduction coefficient KQ is greater than that of other running conditions of the engine 11. Thus, the torque of the engine 11 is prevented from being reduced by an excessive amount when the injection amount is decreased while the engine 11 is running at a low speed at a small load during stratified combustion.

(4) During homogeneous combustion, the torque is reduced by delaying the ignition timing. During stratified combustion, the torque is reduced by decreasing the amount of the fuel injection. Therefore, during homogeneous combustion, the torque reduction is greater than that achieved by reducing the injection amount. Accordingly, during homogeneous combustion, the torque is accurately reduced to a required value. Also, during stratified combustion, the output torque is reduced without degrading the combustion state.

Figure 6:
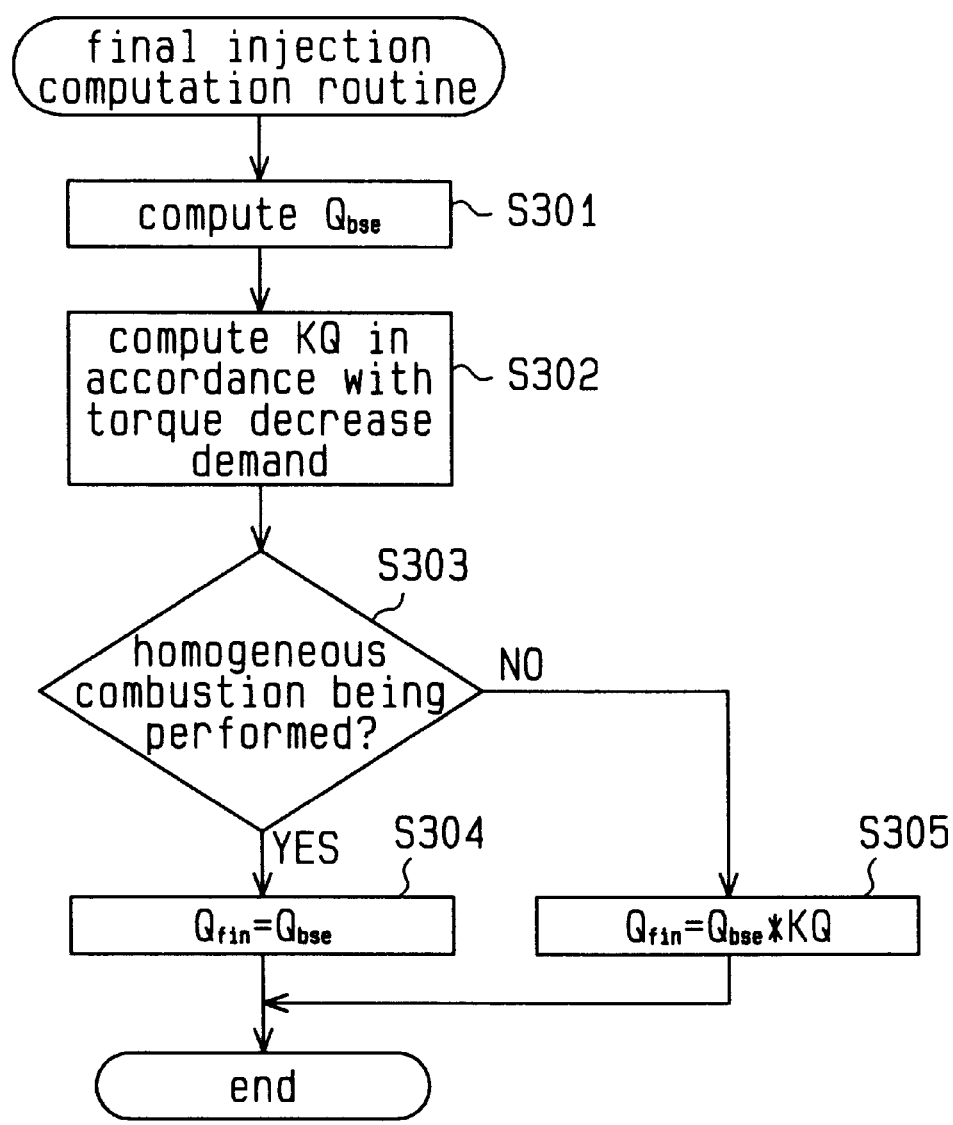
FIG. 6 is a flowchart showing a routine for computing final injection amount according to a second embodiment.
Figure 7:
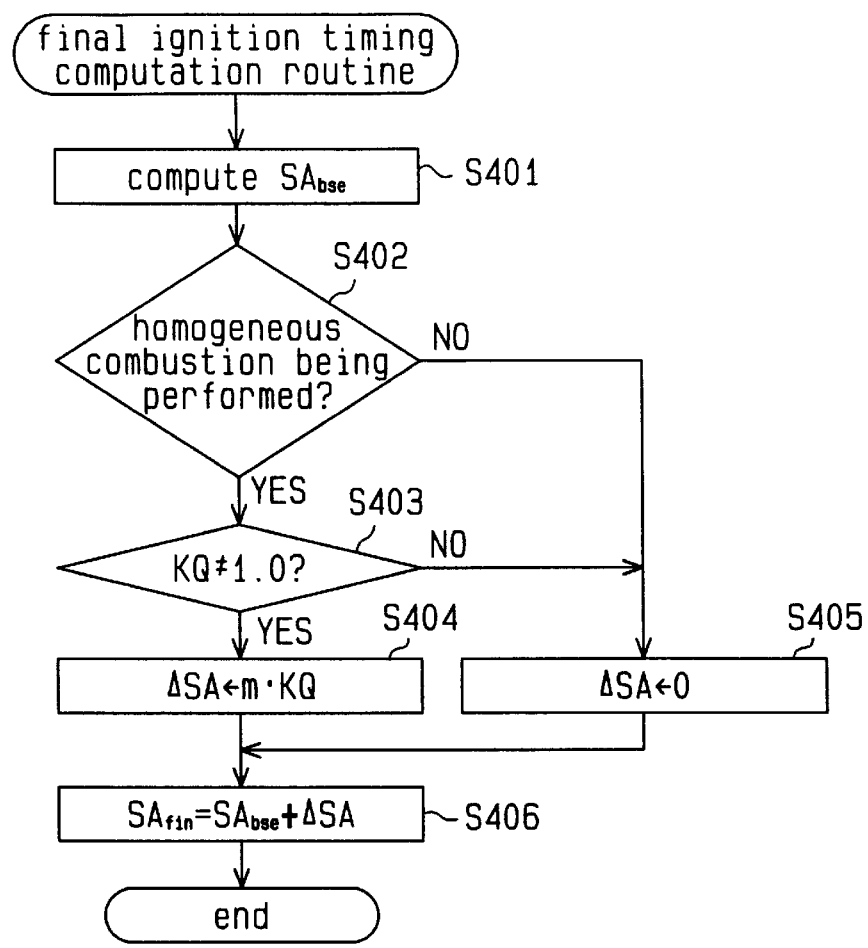
FIG. 7 is a flowchart showing a routine for computing final ignition timing according to the second embodiment.
Figure 8:
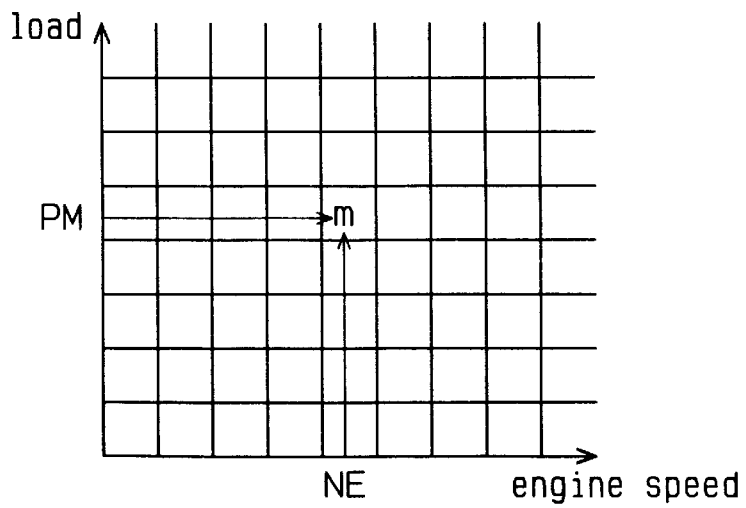
FIG. 8 is a graph showing a map used for determining a conversion value m, which is used for computing ignition timing.

A second embodiment will now be described with reference to FIGS. 6 to 8. The embodiment of FIGS. 6 to 8 is different from the embodiment of FIGS. 1 to 5 in that the delay amount $\Delta$SA is computed based on the reduction coefficient KQ. Specifically, the reduction coefficient KQ, which is used for decreasing the injection amount in accordance with a required torque reduction, is converted into the delay amount $\Delta$SA by using a conversion value m. The differences from the first embodiment of FIGS. 1 to 5 will mainly be discussed below, and like or the same reference numerals are given to those components that are like or the same as the corresponding components of the first embodiment.

Computation of the final injection amount will now be described with reference to FIG. 6. This routine is an interrupt executed by the ECU 92 at predetermined time intervals.

At step S301, the ECU 92 computes the basic injection amount Qbse. At step S302, the ECU 92 computes the reduction coefficient KQ in accordance with a required torque reduction by referring to a map. The map is selected from a set of maps, each of which corresponds to a purpose for reducing the torque. The value of the reduction coefficient KQ decreases as the required torque reduction amount increases and is set to 1.0 when there is no need to reduce the torque. If the engine 11 is running at a low speed with a small load, the reduction coefficient KQ is determined such that reducing the injection amount does not excessively reduce the torque.

At step S303, the ECU 92 judges whether homogeneous combustion is being executed. If homogeneous combustion is being executed, the ECU 92 moves to step S304. At step S304, the ECU 92 sets the basic injection amount Qbse as the final injection amount Qfin and temporarily terminates this routine. If stratified combustion is being executed at step S303, the ECU 92 moves to step S305. At step S305, the ECU 92 multiplies the basic injection amount Qbse with the reduction coefficient KQ for calculating the final injection amount Qfing. Thereafter, the ECU 92 temporarily suspends this routine.

When homogeneous combustion is being performed, the basic injection amount Qbse is used as the final injection amount Qfin at step S304. In other words, the injection amount is not decreased based on the reduction coefficient KQ for decreasing the engine torque. When stratified combustion is being performed, the injection amount is decreased based on the reduction coefficient KQ in accordance with the purpose for reducing the torque. Accordingly, the output torque of the engine 11 is properly reduced during stratified combustion.

Computation of the final ignition timing SAfin will now be described with reference to FIG. 7. This routine is an interrupt executed by the ECU 92 at predetermined time intervals.

At step S401, the ECU 92 computes the basic ignition timing SAbse and then moves to step S402. At step S402, the ECU 92 judges whether homogeneous combustion is being executed. If stratified combustion, not homogeneous combustion, is being executed, the ECU 92 moves to step S405. At step S405, the ECU 92 sets the delay amount $\Delta$SA to zero and moves to step S406. If homogeneous combustion is being executed at step S402, the ECU 92 moves step S403. At step S403, the ECU 92 judges whether the reduction coefficient KQ, which is computed at step S302 of the final injection amount computation routine, has a value other than 1.0. That is, the ECU 92 judges whether there is a need to reduce the engine torque.

If the KQ is 1.0, the ECU 92 judges that there is no need to reduce the engine torque and moves to step S405. If KQ is not 1.0 at step S403, the ECU 92 judges that there is a need to reduce the engine torque and moves to step S404. At step S404, the ECU 92 computes the delay amount $\Delta$SA by multiplying the reduction coefficient KQ with the conversion value m.

The conversion value m is computed based on the intake pressure PM (engine load) and the engine speed NE referring, for example, to a map of FIG. 8. The number of maps for computing the conversion value m does not have to correspond to the number of the purposes for the torque reduction. However, one common map is used for two or more similar purposes. Therefore, the number of the maps for computing the conversion value m is less than the number of the purposes for reducing torque. When computing the conversion value m, the ECU 92 selects a map that corresponds to the purpose of the torque reduction. The ECU 92 then computes the conversion value m based on the selected map.

The delay amount $\Delta$SA, which is computed based on the conversion value m, is increased as the required torque reduction amount is increased and as the reduction coefficient KQ is decreased. When the engine 11 is not running at a low speed with a small load, the conversion value m is determined such that the converted delay amount ΔSA is greater than that when the engine 11 is running at a low speed with a great load. This is because the reduction coefficient KQ is computed at step S302 of the final injection amount computation routine (FIG. 6) such that decreasing the injection amount does not excessively decrease the engine torque when the engine 11 is running at a low speed with a small load. That is, the value of the reduction coefficient KQ when the engine 11 is not running at a low speed with a small load is slightly less than an adequate value. Thus, computing the delay amount ΔSA by converting the reduction coefficient KQ permits the engine torque to be properly deceased by delaying the ignition timing even if the engine 11 is running at a low speed with a small load.

After executing either step S404 or step S405, the ECU 92 moves to step 406. At step S406, the ECU 92 adds the delay amount ΔSA to the basic ignition timing SAbse to calculate the final ignition timing SAfin. The ECU 92 temporarily suspends this routine. The ECU 92 then controls the ignitor 41a for delaying the ignition timing to the final ignition timing SAfin.

During stratified combustion or when there is no need to reduce the engine torque, the delay amount ΔSA is set to zero at step S405. Therefore, the basic ignition timing SAbse is used as the final ignition timing SAfin. Thus, the ignition timing is not delayed based on the delay amount ΔSA for decreasing the engine torque. During homogeneous combustion, the ignition timing is delayed based on the delay amount ΔSA for decreasing the engine torque. Accordingly, the output torque of the engine 11 is properly reduced during homogeneous combustion.

In addition to the advantages (1) and (4) of the embodiment of FIGS. 1 to 5, the embodiment of FIGS. 6 to 8 has the following advantages.

(5) The reduction coefficient KQ is used for decreasing the injection amount. When the reduction coefficient KQ is computed, the reduction coefficient KQ is converted into the delay amount ΔSA based on the conversion value m. The number of the maps for computing the conversion value m do not correspond to the number of the purposes for reducing the torque. However, one common map is used for two or more similar purposes. Thus, the number of the maps for computing the conversion value m is less than the number of purposes for reducing the torque. In other words, compared to a case where maps for computing the delay amount ΔSA and maps for computing the coefficient KQ are prepared for each purpose, the number of the required maps is small. The employment of fewer maps reduces the time required for experiments for preparing the maps and permits the ROM 93 to have a smaller storage capacity.

(6) The reduction coefficient KQ is converted into the delay amount ΔSA by using the conversion value m. The conversion value m is determined in accordance with the engine speed NE and the engine load, which allows the reduction coefficient KQ to be accurately converted into the delay amount ΔSA. When the engine 11 is not running at a low speed with a small load, the conversion value m is determined such that the delay amount ΔSA is greater than that when the engine 11 is running at a low speed with a small load. Thus, during homogeneous combustion, the engine torque is accurately reduced by delaying the ignition timing even if the engine 11 is not running at a low speed with a small load.

The illustrated embodiments may be modified as follows. The following constructions have the same advantages as the illustrated embodiments.

The illustrated embodiments are applied to an engine 11 that changes between stratified combustion and homogeneous combustion. However, the present invention may be embodied in an engine that switches among four combustion modes, that is, stratified combustion, semi-stratified combustion, homogeneous lean combustion and homogeneous stoichiometric combustion. Homogenous lean combustion refers to a combustion mode in which fuel is homogeneously mixed with air at an air-fuel ratio greater than the stoichiometric air-fuel ratio. Semi-stratified combustion refers to an intermediate mode of homogeneous lean charge combustion and stratified combustion. During stratified combustion and semi-stratified combustion, the engine torque is reduced by decreasing the injection amount. During homogeneous lean combustion and homogeneous stoichiometric charge combustion, the engine torque is reduced by delaying the phase of the ignition timing. Depending on which combustion mode is switched to which mode, maps for computing the conversion values n, m are selected. The conversion between the delay amount ΔSA and the reduction coefficient KQ is carried out based on the selected conversion value n, m.

In the illustrated embodiments, the engine torque is reduced by delaying the ignition timing or by decreasing the fuel injection amount. However, the engine torque may be reduced by other modes.

In the illustrated embodiments, the conversion values n, m are computed based on maps. However, the values n, m may be computed by equations.

Therefore, the present examples and embodiments are to be considered as illustrative and not restrictive and the invention is not to be limited to the details given herein, but may be modified within the scope and equivalence of the appended claims.

What is claimed is:

1. A controller of an engine having a plurality of combustion modes, one of which being selected depending on the running conditions of the engine, wherein the controller reduces the output torque of the engine according to one of a plurality of predetermined torque reduction methods when a torque reduction requirement is in effect, the controller comprising:

control means for controlling the engine to decrease the output torque according to a first torque reduction method when the engine is in a first combustion mode and for controlling the engine to decrease the output torque according to a second torque reduction method when the engine is in a second combustion mode, which is different from the first combustion mode;

setting means for setting a first control amount that corresponds to the torque reduction requirement according to the first torque reduction method; and converting means for converting the first control amount to a second control amount according to the second torque reduction method;

wherein the control means controls the engine according to the first control amount when the control means reduces the output torque by the first torque reduction method, and wherein the control means controls the engine according to the second control amount when the control means reduces the output torque by the second torque reduction method.

2. The controller according to claim 1, wherein the converting means converts the first control amount to the second control amount according to the engine load and the engine speed.

3. The controller according to claim 1, wherein the combustion modes include stratified combustion and homogeneous combustion.

4. The controller according to claim 3, wherein the controller controls the engine in accordance with the first torque reduction method when the engine is in the homogeneous combustion mode and controls the engine in accordance with the second torque reduction method when the engine is in the stratified combustion mode.

5. The controller according to claim 1, wherein the first torque reduction method relates to a control method for delaying the ignition timing.

6. The controller according to claim 1, wherein the second torque reduction method relates to a control method for reducing the amount of fuel injection.

7. The controller according to claim 3, wherein the controller controls the engine in accordance with the first torque reduction method when the engine is in the stratified combustion mode and controls the engine in accordance with the second torque reduction method when the engine is in the homogeneous combustion mode.

8. The controller according to claim 7, wherein the first torque reduction method relates to a control method for reducing the amount of fuel injection.

9. The controller according to claim 7, wherein the second torque reduction method relates to a control method for delaying the ignition timing.

10. A controller of an engine having a stratified combustion mode and a homogeneous combustion mode, one of which is selected depending on the running conditions of the engine, wherein the controller reduces the output torque of the engine according to one of a plurality of predetermined torque reduction methods when a torque reduction requirement is in effect, the controller comprising:

control means for controlling the engine to decrease the output torque according to a first torque reduction method when the engine is in the homogeneous combustion mode and to decrease the output torque according to a second torque reduction method when the engine is in the stratified combustion mode;

setting means for setting a first control amount that corresponds to the torque reduction requirement according to the first torque reduction method; and converting means for converting the first control amount to a second control amount according to the second torque reduction method, wherein the control means controls the engine according to the first control amount when the control means reduces the output torque by the first torque reduction method, and wherein the control means controls the engine according to the second control amount when the control means reduces the output torque by the second torque reduction method.

11. The controller according to claim 10, wherein the converting means converts the first control amount to the second control amount according to the engine load and the engine speed.

12. The controller according to claim 10, wherein the first torque reduction method relates to a control method for delaying the ignition timing.

13. The controller according to claim 10, wherein the second torque reduction method relates to a control method for reducing the amount of fuel injection.

14. A controller of an engine having a stratified combustion mode and a homogeneous combustion mode, one of which is selected depending on the running conditions of the engine, wherein the controller reduces the output torque of the engine according to one of a plurality of predetermined torque reduction methods when a torque reduction requirement is in effect, the controller comprising:

control means for controlling the engine to decrease the output torque according to a first torque reduction method when the engine is in the stratified combustion mode and to decrease the output torque according to a second torque reduction method when the engine is in the homogeneous combustion mode;

setting means for setting a first control amount that corresponds to the torque reduction requirement according to the first torque reduction method; and converting means for converting the first control amount to a second control amount according to the second torque reduction method, wherein the control means controls the engine according to the first control amount when the control means reduces the output torque by the first torque reduction method, and wherein the control means controls the engine according to the second control amount when the control means reduces the output torque by the second torque reduction method.

15. The controller according to claim 14, wherein the converting means converts the first control amount to the second control amount according to the engine load and the engine speed.

16. The controller according to claim 14, wherein the first torque reduction method relates to a control method for reducing the amount of fuel injection.

17. The controller according to claim 14, wherein the second torque reduction method relates to a control method for delaying the ignition timing.

* * * * *